July 22, 1958     E. F. W. ALEXANDERSON     2,844,779

MAGNETIC AMPLIFIER MOTOR CONTROL SYSTEM

Filed March 31, 1954

INVENTOR.
ERNST F. W. ALEXANDERSON

BY H. D. Newton

ATTORNEY

United States Patent Office 2,844,779
Patented July 22, 1958

2,844,779

MAGNETIC AMPLIFIER MOTOR CONTROL SYSTEM

Ernst F. W. Alexanderson, Schenectady, N. Y.

Application March 31, 1954, Serial No. 420,111

13 Claims. (Cl. 318—298)

This invention relates to magnetic amplifier system and more particularly relates to magnetic amplifiers connected in cascade relation for amplifying signal currents.

A magnetic amplifier is essentially a variable inductance device for controlling the flow of power to a load. The term magnetic amplifier has often been used interchangeably with the terms saturable recator, transductor etc., with the older term, saturable reactor, being the more widely recognized. It is now generally recognized that a saturable reactor is a part of a magnetic amplifier either alone or connected with other circuit elements in such a manner as to obtain signal amplification for the control of some utilization or load circuit.

Simple saturable reactors, saturable core reactors, D. C. control reactors, saturable transformers, transductors and the like are saturable core inductors having an alternating current winding, the impedance of which is controlled by controlling the saturation of the reactor core. The saturation of the core may be controlled by the application of a magneto-motive force from an external source such as, for example, an auxiliary or control winding. Windings on an unsaturated magnetic core present a relatively high impedance to alternating current. A saturated core may be considered to act effectively as an air core in that the windings thereon have practically no impedance except for the ohmic resistance of the reactor windings.

A simple magnetic amplifier may consist of a control circuit, and a load circuit. The control circuit includes control windings which are magnetically coupled to the reactor winding for providing saturation control of the reactor core.

The load circuit of the simple magnetic amplifier generally includes the series connection of a source of alternating current power, a saturable reactor, and a load impedance. The signal current applied to the control winding of the saturable reactor determines the point during the alternating current power cycle that the core saturates and allows load current to flow. In this respect a magnetic amplifier may be considered analogous to a thyratron control circuit.

In general, the form of magnetic amplifier utilizing only a single control winding and reactor winding is seldom used because the load current through the reactor winding induces an undesirable voltage of the power frequency in the control winding. Is is therefore customary to use various core configurations and/or connections of reactor and control windings to neutralize the voltage of the power frequency induced in the control winding. Ordinarily, a conventional two-stage neutralized magnetic amplifier stage requires at least two saturable magnetic cores in both the first and second stages, or a total of four cores.

It is an object of this invention to provide a cascade magnetic amplifier which is comparable with a conventional single stage magnetic amplifier in compactness and simplicity.

Another object of this invention is to provide a stabilized cascade magnetic amplifier having improved control circuit connections and has the advantages of superior gain and speed of response.

A simple magnetic amplifier as described above is inefficient in that a large control current is required to control the reactor core. It is well known that the efficiency of a simple magnetic amplifier such as that described above, may be increased by the addition of a rectifier in series with the reactor winding. Since the load current through the reactor only flows in one direction because of the rectifier, the reactor has an autosaturation or self-saturating effect. The control current required for maximum output in the self-saturating magnetic amplifier will be the small magnetizing force corresponding to the well known knee in conventional magnetization curves. This control current is much less than is required for the simple magnetic amplifier.

In general, one disadvantage of magnetic amplifiers is that the time constant, or the speed of response, is low compared to that of vacuum tubes and semi-conductor amplifiers. In order to amplify audio frequency signal currents, it is obvious that the magnetic amplifier should have a speed of response which is fast enough to handle the rapidly changing audio signal currents. In the design and use of magnetic amplifiers, it is recognized that the speed of response can be improved by sacrificing gain, and it is difficult to construct a magnetic amplifier having a high speed of response while retaining a relatively high gain.

It is accordingly an object of this invention to provide a simplified magnetic amplifier which has an improved power gain and also a superior speed of response, and is characterized by its stability of operation.

A further object of this invention is to provide an improved cascade magnetic amplifier utilizing fewer components than heretofore, while retaining high gain and a high speed of response.

A still further object of this invention is to provide a magnetic signal amplifier system having improved electrical coupling means between a pair of magnetic amplifier stages.

In accorance with an embodiment of the invention, a two-stage cascade magnetic amplifier is provided which includes a first and a second self-saturating magnetic amplifier each connected across a source of alternating current. The first magnetic amplifier is provided with a control circuit for controlling the load current therein with a control signal. The control signal is amplified by the first amplifier and coupled to the reactor winding of the second magnetic amplifier to provide a premagnetization or saturating control. The second amplifier also amplifies the control signal and feeds it to a load or utilization device.

Further in accordance with the invention, the control circuit for the first magnetic amplifier includes a control winding which selectively premagnetizes the saturable reactor of that amplifier. A second winding is coupled with the second magnetic amplifier and is connected in series opposition with the first winding to neutralize alternating voltages of the source frequency induced therein.

Still further in accordance with the invention, there is provided means for coupling the cascade magnetic amplifiers in such a manner to materially increase the speed of response thereof.

In yet another aspect of the invention, a feedback circuit is provided from the second magnetic amplifier to the first magnetic amplifier to provide a greater degree of stability of operation than heretofore known.

The novel features that are considered characteristic of this invention are set forth with particularity in the appended claims. The invention itself, however, both as to its organization and method of operation, as well as additional objects and advantages thereof, will be best understood from the following description when read in conjunction with the accompanying drawings, in which:

Figure 1:
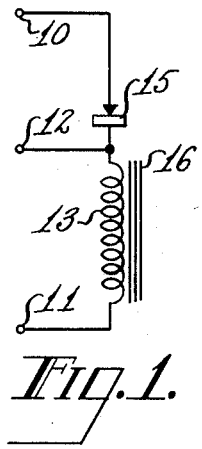
Figure 1 is a schematic circuit diagram of a simple self-saturating magnetic amplifier which is shown by way of example to compare certain operational characteristics thereof with that of a triode.

Referring now to the drawings wherein like reference characters are used to designate like components or equivalents thereof in the different figures, and particularly to Figure 1, a source of alternating current, not shown, is connected to a pair of terminals 10 and 11. The frequency of the power source is a matter of design. It is found desirable in some instances to construct the power source to have a frequency of between 2 to 5 times the highest signal frequency to be amplified to avoid beat notes and other disturbances.

A self-saturating magnetic amplifier comprising a saturable reactor 13 and a diode 15 are serially connected with the power source terminals 10 and 11. The amplifier has three terminals 10, 11, and 12 which correspond to the anode, cathode, and control electrodes respectively, of a triode. As is the case with a triode amplifier, this magnetic amplifier is non-conductive in one direction because of the rectifier 15, and its impedance is controlled in accordance with signal currents introduced at the control terminal 12.

The signal current provides selective saturation of the saturable core 16. The extent of saturation of the core 16 determines the reactance of the reactor winding 13. Again, the triode and this magnetic amplifier are similar in that both are variable impedance devices, the triode having variable resistance and the magnetic amplifier having a variable reactance.

This magnetic amplifier unit will hereinafter be referred to in the following discussion as a reactor diode. It can serve as a building block for improved types of magnetic amplifiers similar to the way the triode amplifier serves as a building block for electronic amplifiers.

Figure 2:
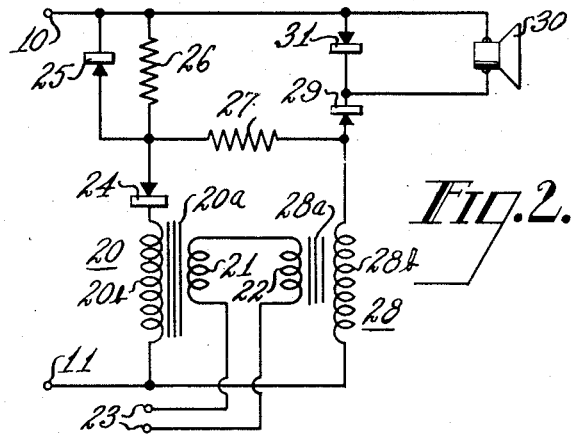
Figure 2 is a schematic circuit diagram of a two-stage cascade magnetic amplifier system constructed in accordance with the invention.

Referring now to Figure 2, a source of alternating current, not shown, may be connected with a pair of terminals 10 and 11. A first reactor diode comprising a saturable reactor 20 having a saturable magnetic core 20a, a load winding 20b, and a rectifier 24 is connected in series with a biasing resistor 26. The resistor 26 is shunted by a rectifier 25. The series combination of the resistor 26 and the reactor diode is connected across the alternating current power source terminals 10 and 11. The rectifier 25 is connected back-to-back with the rectifier 24 so that the resistor 26 will not be short-circuited while the first reactor diode is conducting load current.

A second reactor diode comprising a saturable reactor 28 and a rectifier 29 is serially connected with a load or utilization device 30, and this series circuit is connected between the terminals 10 and 11 of the alternating current power source.

The second reactor diode is coupled to the first reactor diode through a coupling resistor 27.

A control winding 21 is coupled with the saturable reactor 20 for providing selective saturation of the reactor core 20a. A second winding 22 which is connected in series with the control winding 21, is coupled with the reactor winding 28. The windings 21 and 22 are connected with a pair of terminals 23, to which the signals to be amplified may be applied.

The windings 21 and 22 are so coupled to the reactor windings 20b and 28b respectively, that the voltages of the power frequency induced in the control winding 21 by the current flowing through the reactor winding 20b are neutralized by an equal and opposite voltage induced in the winding 22 by current flowing in the reactor winding 28b. The winding 22, however, does not perform any control function due to the physical construction of the second reactor 28.

For an understanding of the operation of the cascade magnetic amplifier as shown in Figure 2, it is helpful to trace the chain of cause and effect under two extreme conditions: full positive control current, and full negative control current.

The diodes 24 and 29 respectively, of the two stages are relatively reversed so that the first reactor diode conducts on one half cycle of the power voltage and provides a forward magnetization in the core 20a and the second reactor diode conducts during the next half cycle to provide a forward magnetization in the core 28a.

Whether full saturating current will flow in the first reactor diode or only the negligible magnetizing current, depends on the premagnetization of the core 20a by the control winding 21 during the preceding half cycle of the power supply voltage. If the premagnetization of the core 20a is in a reverse direction, only the negligible magnetizing current will flow. Control current in the winding 21 which produces reverse magnetization of the core 20a will be hereinafter referred to as negative control current whereas control current which produces forward magnetization of the core 20a will be referred to as positive control current. If the premagnetization is forward, the impedance of the winding 20b will be greatly reduced and saturating current will flow.

Under conditions where there is a negative control current in the winding 21 whereby a reverse magnetization is produced in the core 20a, the following half cycle of power voltage produces only magnetizing current through the first reactor diode. A relatively high potential is developed across the first reactor diode because of the relatively high impedance thereof. The potential developed across the first reactor diode is effectively connected across the saturable reactor 28 of the second reactor diode through the resistor 27 whereby a reverse magnetization is produced in the core 28a.

During the next half cycle of power voltage, the current which passes through the second reactor diode which is the same current that passes through the load 30 is, therefore, also only magnetizing current.

If the signal introduced through the terminals 23 produces a positive control current in the control winding 21, a forward magnetization will be provided in the core 20a and saturating current will flow in the reactor winding 20b during the next half cycle of power voltage. The saturation of the reactor 20 effectively creates a short-circuit across the winding 28b. Due to induction, the reactor winding 20b opposes changes in current flow, and after the power voltage has passed through maximum this winding tends to keep current flowing at the same level therethrough. Since this current can not flow back through the terminal 11, it is forced to flow through the reactor winding 28b in such a direction as to produce a forward magnetization of the core 28a.

On the next half cycle of power voltage, forward magnetization of the second core 28a lowers the impedance of the winding 28b, thus allowing saturating current to flow. The saturation current of the second reactor diode is also the current which flows through the load or utilization device 30.

Thus as shown above, full negative control current produces a minimum load current whereas full positive control current produces maximum load current. A range of linear relationship can be found between these extremes.

In the above described cascade amplifier, either a sustained uni-directional control current or an alternating control current of lower frequency than the frequency of the power source, produces a corresponding output current.

The speed of response of the cascade magnetic amplifier described above will now be considered. The time constant of the second reactor diode is one-half cycle of the power source frequency under all circumstances because the first stage is always capable of delivering full voltage for the control of the second reactor diode.

The time constant of the first stage is a minimum of one-half cycle of the power source frequency. The time delay in the first stage is a half cycle only if full control voltage is applied to the control circuit. This is practical since it permits the design of a control system which utilizes full control voltage for only a very rapid change but works for smaller changes with still greater sensitivity such as is common in selsyn systems. Since the time constant of the second stage is one half cycle and the time constant of the first stage is a minimum of a half cycle, the minimum time constant of the entire circuit is one cycle of the power source frequency.

Feedback from the second stage to the first stage could cause serious time delay in the first stage unless steps are taken to prevent such feedback. The danger of such a delaying feedback occurs when the control signal calls for a sudden transition from full load or high output current to no load or low output current.

The first stage tends to increase the voltage across the reactor winding 20b in response to the reverse magnetization of the core 20a by the control winding 21. If the first stage is connected directly with the second stage, assuming the resistor 27 to be short-circuited, this increase in voltage can not take place since the reactor 28 while saturated provides substantially a short-circuit across the reactor winding 20b.

This difficulty may be overcome by introducing the resistor 27 in the connection between the two stages. The resistor 27 eliminates the short-circuit across the reactor winding 20b and allows voltage to be built up across the reactor 20.

However, the addition of the resistor 27 does not provide a complete solution to increasing the speed of response of the amplifier. It should be noted that most magnetic amplifiers have a time constant of several cycles of the power source frequency because there is usually a loop circuit in which current is induced which counteracts the control current when the control calls for a sudden change from full load to no load. Referring to Figure 2, this loop circuit comprises the reactor 20, the diode 24 and the reactor 28.

As noted above, the difficulty occurs during the half cycle when the reactor 28 is saturated and carries full current. If during that same half cycle the signal calls for a sudden change to no load, this change must be initiated by a reverse premagnetization of the reactor 20. Such a premagnetization can take place during this same half cycle provided that full voltage is applied to the control winding and also provided that nothing prevents full voltage from developing on the reactor winding 20.

The voltage induced in the reactor 20 by the control winding 21 is of such polarity that it tends to cause current to flow through the diode 24, the resistor 27 and the reactor 28. If this current is allowed to flow it will oppose the premagnetization of the reactor 20. A counter voltage introduced in the loop circuit can, however, prevent the undesired flow of current.

This counter voltage is introduced by connecting one terminal of the coupling resistor 27 to the power terminal 10 through the diode 25. The other terminal of the resistor 27 is held close to the potential of the power terminal 11 by the saturated reactor 28. Thus, it can be seen that a counter voltage is induced in the loop circuit across the resistor 27 which is substantially equal and opposite to the voltage induced by the control in the reactor 20 and accordingly, no current will flow which might oppose the development of this voltage. The first amplifier stage thus changes from full load to no load operation in one half cycle and premagnetizes the second stage for no load operation in the next half cycle.

If the diode 25 is omitted from the circuit and the resistance of the resistor 27 is made one half as great as the resistance of the resistor 26, the counter voltage developed in the resistor 27 is only one third as great as in the former case and the amplifier is only one third as fast. Even so, the amplifier is very fast because it adds only two half waves at the power frequency to the time constant. The coupling resistor 27 may be replaced by a reactance as will hereinafter be described in connection with Figure 4.

Figure 3:
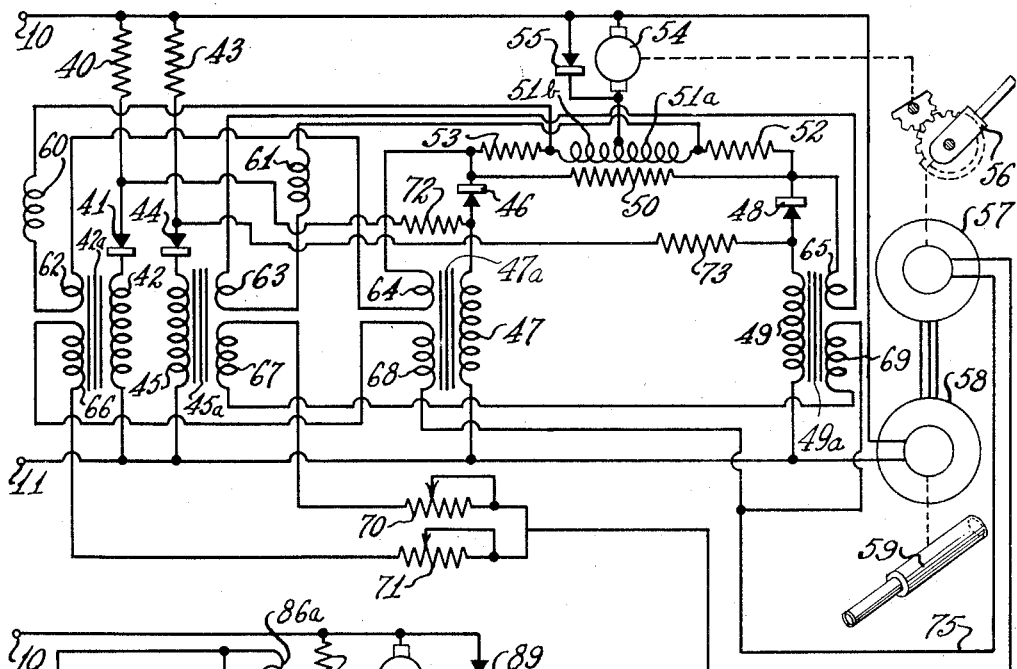
Figure 3 is a schematic circuit diagram of a pair of push-pull cascade magnetic amplifiers constructed in accordance with the invention for controlling a load in response to a predetermined control signal.

Reference is now made to Figure 3, which shows a pair of cascade magnetic amplifiers which are connected in push-pull relation for controlling the flow of current to a load. A source of alternating current, not shown, is connected to the magnetic amplifier system through a pair of terminals 10 and 11. A first self-saturating magnetic amplifier comprising a resistor 40, a rectifier 41, and a saturable reactor 42 is serially connected between the power supply terminals 10 and 11. The output signals from this amplifier are connected through a resistor 72 to control one of the push-pull output stages. A second self-saturating magnetic amplifier comprising a resistor 43, a rectifier 44, and a saturable reactor winding 45 is also connected between the power supply terminals 10 and 11. The output signals from this amplifier are connected through a resistor 73 to control the other of the push-pull magnetic amplifier output stages.

A motor armature 54 is connected in the load current circuit with both of the push-pull output stages. The motor has two field windings 51a and 51b, one of which is connected in series with each of the push-pull output stages. The windings are connected such that one functions to cause forward rotation of the motor armature, and the other for reverse rotation.

The output stage which is coupled with the aforementioned first magnetic amplifier, comprises a saturable reactor 47, and a rectifier 46, which are serially connected with a resistor 53, the field winding 51b and the motor armature 54. This series combination is connected with the power terminals 10 and 11. The other output stage of the push-pull amplifier comprises a saturable reactor 49 and a rectifier 48, which are serially connected with a resistor 52, the field winding 51a and the motor armature 54 between the power terminals 10 and 11. A rectifier 55 is connected in shunt with the motor armature in order to maintain a continuity of current therethrough. It must be remembered that the induction of the motor winding tends to keep current flowing on the half cycles of power current when neither of the output stages are conductive. A resistor 50 is connected in shunt with the field windings 51a and 51b in order to maintain continuity of field flux.

The control system embodying the invention shown in Figure 3 is used to control a gun 56 in accordance with a direction finding mechanism such as, for example, a telescope 59. It is understood that the invention can be used for many other purposes and is not restricted to the particular application shown herewith.

The telescope 59 is mechanically coupled with a selsyn generator 58 which is energized by the source of alternating current connected with the terminals 10 and 11. The selsyn generator 58 is electrically coupled to a selsyn transformer 57 in such a manner that an output control signal is developed in response to angular displacement between the rotor elements of the selsyns 57, 58.

The rotor of the selsyn 57 is mechanically coupled with the gun 56. A difference in the relative mechanical angular displacement of the rotor elements of the two selsyns 57 and 58 due to adjustment of the telescope 59 produces an output or control current which is fed to the magnetic amplifier control system through the conductors 75 and 76.

The output signal from the selsyn transformer 57 is amplified by the magnetic amplifier system to control the current flow in the field windings 51a, 51b whereby the armature 54 is moved selectively in one direction or the other until the gun 56 and the mechanically coupled rotor of the selsyn 57 are rotated to correspond to the angular displacement of the rotor of the selsyn 58. When this condition is reached, the output or control signal of the selsyn 57 goes to zero and no further rotation of the gun 56 will be effective.

The output signal from the selsyn system is fed to the control circuits of the two magnetic amplifiers. The first control circuit comprises the series connection of a control winding 67, a neutralizing winding 69, and a resistor 70. The second control circuit comprises the series combination of a control winding 66, a neutralizing winding 68, and a resistor 71. The two control circuits are connected in parallel and coupled so that the respective magnetic amplifiers have opposite effects on the system and, hence, provide a push-pull action.

It should be observed that the neutralizing windings 68 and 69 in the second stage of the cascade amplifiers is a form of regenerative feedback. Too much regeneration can cause instability. On the other hand, a proper relation between regeneration and impedances can result in high sensitivity without instability, as for instance, in a regenerative detector for radio signals. Accordingly, the resistors 70 and 71 are serially connected in the control circuit and may be adjusted to provide optimum sensitivity without instability.

Servo mechanisms usually require an anti-hunting system. Such a system is provided by the auxiliary windings 62, 63, 64, and 65. The uni-directional potential developed across the resistor 53 is fed back by means of the winding 62. The winding 64 neutralizes the voltage of power frequency induced in the control winding. An inductor 60 is provided in series with the auxiliary windings 62 and 64 to provide a predetermined feedback delay.

Similarly a uni-directional signal is derived from the load resistor 52 and fed back through the series combination of the control winding 63 and the neutralizing winding 65. An inductor 61 is serially connected in circuit with these auxiliary windings as described above, to provide a predetermined delay in the action of the feedback signal. The respective feedback signals stabilize the servo-system to prevent hunting of the motor armature 54.

In the operation of the control system shown in Figure 3, when the direction finder 59 is moved in one direction, a control signal will be developed by the selsyn-generator 57. If this control signal produces a forward magnetization in the core 42a, a reverse magnetization is provided in the core 45a. As was explained in connection with Figure 2, the neutralizing windings 68 and 69 have very little control effect upon the reactors 47 and 49 due to the physical construction thereof.

Since the magnetizations of the cores 42a and 45a respectively, are in opposite directions, the control signal is amplified in push-pull and fed respectively to the output stages through the resistors 72 and 73, respectively.

As noted above, when the reactor core 42a is biased in a forward direction the current flowing through the winding 42 will cause the reactor core 47a to have a forward magnetization. In like manner, due to the reverse magnetization of the reactor core 45a the reactor core 49a will be effected with reverse magnetization.

The output currents flowing through the respective motor field windings 51b and 51a are controlled in accordance with the relative saturation of the cores 47a and 49a. Since the core 47a in this case is magnetized in a forward direction, the current flowing through the reactor winding 47 will be greater than that through the reactor winding 49 which is biased in a reverse direction. Hence, the field winding 51b conducts more current than field winding 51a and is the controlling factor in determining the direction in which the motor armature 54 will be rotated. If the control signal from the selsyn generator were reversed the winding 51a would conduct more current and, hence, be the controlling factor in determining the direction of the armature 54 rotation.

Figure 4:
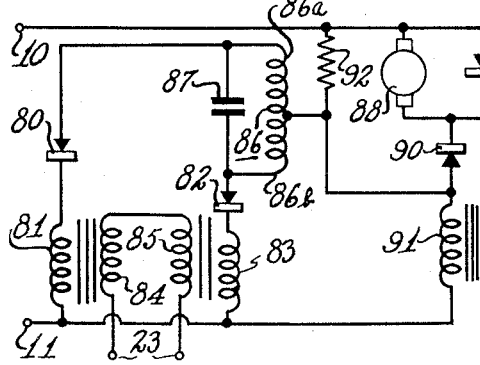
Figure 4 is a schematic circuit diagram of another embodiment of the invention showing a push-pull cascade magnetic amplifier utilizing a reduced number of magnetic cores.

Referring now to Figure 4, a pair of terminals 10 and 11 are connected with an alternating current source (not shown). A motor field winding 86 is controlled by a pair of reactor diodes which function alternately for forward and reverse direction. The first reactor 81 and rectifier 80 is connected in parallel with a second reactor 83 and rectifier 82. The rectifiers 80 and 82 are oriented to conduct current in the same direction. A central tap on the field winding 86 is connected to the terminal 10 of the alternating power source through a resistor 92.

A motor armature 88 is serially connected with a second magnetic amplifier stage comprising rectifier 90 and the saturable reactor 91. The second stage controls the motor current for both directions of rotation. A rectifier 89 is in shunt with the motor armature 88 to allow continuity of current flow therethrough due to the induction of the armature.

The embodiment of the amplifier shown in Figure 4 operates in a similar manner to that shown in Figures 2 and 3. A control signal for the amplifier unit is introduced through the terminals 23. The control current passes through the serially connected control windings 84 and 85 to selectively control the saturation of the reactors 81 and 83.

The control windings 84 and 85 of the two reactors 81 and 83 respectively, are relatively reversed so that a given control current gives one reactor forward magnetization and the other reverse magnetization. The power frequency voltages induced in the windings 84 and 85 will be neutralized since as noted above, the windings 84 and 85 are relatively reversed.

The system shown in Figure 4 has the same advantage as the one shown in Figures 2 and 3 in that it responds either to an A.-C. control current which can be delivered directly from a selsyn system, or a uni-directional control current. The motor may be reversed by phase reversal of the A.-C. control current. The premagnetizing half cycle of the two parallel reactor diodes is that half cycle when the terminal 10 is negative with respect to terminal 11 and the parallel reactor diodes are non-conductive. When the negative half cycle of the control current coincides with the negative half cycle of the power, one of the reactor diodes is activated, and the other is deactivated depending on the sense of the control current. Phase reversal of an A.-C. control current reverses the conductivity of the reactor diodes and also reverses the motor field and, hence, the rotation of the motor.

The power for excitation of the motor field 86 is delivered through a resistor 92 which serves as a negative biasing resistor for the second stage, as was described in connection with Figure 2. When the control current in windings 84 and 85 activates one or the other of the two reactor diodes of the first stage, it diverts the negative bias current from the second stage reactor diode and thereby changes its magnetization so as to cause current to flow in the armature circuit.

An electrolytic capacitor 87 is connected between the outside terminals of the motor field winding 86. The main purpose of the capacitor 87 is to maintain a continuity of the field flux in the motor field winding and to reduce the impedance which might otherwise reduce the effectiveness of the parallel connected reactor diodes. A resistor may be used for substantially the same purpose as is done in Figure 3, but a capacitor is more effective in some applications and can be used to advantage with the higher impedance field winding characteristic of the control system of Figure 4.

It can be seen that in accordance with the present invention, an improved cascade magnetic amplifier has been provided which is comparable with a single stage conventional amplifier in compactness and simplicity and has the advantage of superior gain and speed of response.

What is claimed is:

1. An amplifier system comprising in combination, alternating current supply means, a first magnetic amplifier stage having a load winding connected with said supply means, control means having a signal input circuit for said first magnetic amplifier for controlling current flow in said load winding, a second magnetic amplifier stage connected in cascade with said first magnetic amplifier and including a load winding and a rectifier connected in series with said supply means, signal input means for said second magnetic amplifier stage for controlling the current flow in the load winding thereof in accordance with the current flow in the load winding of said first magnetic amplifier stage comprising a signal coupling connection from said first magnetic amplifier stage to the connection between the rectifier and load winding of said second magnetic amplifier stage, and utilization means connected with the rectifier and load winding of said second magnetic amplifier stage.

2. A magnetic amplifier system comprising in combination, a pair of terminals for connection with an alternating current supply means, a first self-saturating magnetic amplifier including a saturable reactor winding and a rectifier, an impedance element, means connecting said impedance element in series with said rectifier and saturable reactor winding of said first magnetic amplifier between said pair of terminals, a signal input circuit for said first magnetic amplifier connected to control the flow of current from said supply means through said saturable reactor winding, a second self-saturating magnetic amplifier connected in cascade relation with said first magnetic amplifier and including a saturable reactor winding and rectifier connected in series between said terminals, the rectifiers of said first and second magnetic amplifier being poled to conduct on different half cycles of an alternating current applied to said terminals, means providing a signal input circuit for said second magnetic amplifier including the connection of the rectifier and saturable reactor winding of said first magnetic amplifier in parallel with the saturable reactor winding of said second magnetic amplifier to control the flow of current from said supply means therethrough, and utilization means connected in circuit with said second magnetic amplifier.

3. A magnetic amplifier comprising in combination a saturable reactor having a load winding and a control winding, a pair of terminals for connection to an alternating current source, a series circuit connected between said terminals comprising an impedance element, a first rectifier and said load winding, a second saturable reactor having a load winding, a second series circuit connected between said terminals comprising the load winding for said second saturable reactor and a second rectifier, said first and second rectifiers being connected in said first and second series circuits to be conductive on opposite half cycles of an alternating current applied to said terminals, a signal input circuit for said magnetic amplifier connected with said control winding, and a signal coupling circuit including a coupling impedance connecting said first and second series circuits to control the current flow in the load winding for said second saturable reactor winding in accordance with a signal current supplied to said control winding, said coupling impedance being connected from the junction of the load winding of said second saturable reactor and said second rectifier to said impedance element in said first series circuit, and utilization means connected with said second magnetic amplifier.

4. A magnetic amplifier system as defined in claim 2 wherein said series connected impedance comprises a resistor.

5. A magnetic amplifier system as defined in claim 3 wherein said coupling impedance comprises a resistor.

6. A magnetic amplifier system comprising in combination, alternating current supply means, a first magnetic amplifier stage having a load winding and a rectifier connected in series with said supply means, control means having a signal input circuit coupled with said first magnetic amplifier for controlling the current flow in said load winding, a second magnetic amplifier stage connected in cascade with said first stage and including a load winding and a rectifier connected in series with said supply means, means coupling said first magnetic amplifier in parallel with the second stage load winding for controlling the current flow in said winding in accordance with the flow of current in the load winding of said first magnetic amplifier stage, said coupling means comprising a signal coupling connection from said first magnetic amplifier stage to the connection between the rectifier and load winding of said second magnetic amplifier stage, a load circuit connected with the rectifier and load winding of said second magnetic amplifier stage, and a feedback winding connected with a portion of said load circuit and coupled to the load winding of said first magnetic amplifier for providing further control of the current flow therein.

7. A magnetic amplifier system as defined in claim 6, wherein a second winding is connected in series with said feedback winding and means coupling said second winding to said second stage load winding for balancing out potentials induced in said winding of the alternating current frequency.

8. A magnetic amplifier system as defined in claim 6, wherein an inductor is connected in series with said feedback winding for providing a predetermined delay of feedback current.

9. A two-stage magnetic amplifier system comprising in combination, a first and a second magnetic amplifier stage each comprising a saturable reactor having a single reactor core, a saturable reactor winding and a single rectifier, a loop circuit including a coupling impedance for coupling the first stage to the second stage in cascade relation, said loop circuit comprising in series connection the saturable reactor winding of the first stage, the rectifier of the first stage, said coupling impedance and the saturable reactor winding of the second stage, and means for developing a voltage drop in said coupling impedance which opposes the transient control voltage induced in said loop circuit during the premagnetizing half cycles of the first stage.

10. A two-stage magnetic amplifier system comprising in combination, a pair of terminals for connection with a source of alternating current power, a first and a second magnetic amplifier stage each comprising a saturable reactor having a saturable reactor winding a single reactor core and a single rectifier, each of said magnetic amplifier stages connected with said pair of terminals, a loop circuit including a coupling impedance for coupling the first stage to the second stage, said loop circuit comprising in series connection the saturable reactor winding of the first stage, the rectifier of the first stage, said coupling impedance and the saturable reactor winding of the second stage, and means for developing a voltage drop in said coupling impedance which opposes the transient control voltage induced in said loop circuit during the premagnetizing half cycles of the first stage comprising a resistor connected from the junction of the coupling impedance and the first stage to one of said pair of terminals.

11. A two-stage magnetic amplifier system comprising in combination, a pair of terminals for connection with a source of alternating current power, a first and a second magnetic amplifier stage each comprising a saturable reactor having a load winding and a single rectifier, each of said magnetic amplifier stages connected with said pair of terminals, a loop circuit including a coupling impedance for coupling the first stage to the second stage, said loop circuit comprising in series connection the load winding of the first stage, the rectifier of the first stage, said coupling impedance and the load winding of the second stage, and means for developing a voltage drop in said coupling impedance which opposes the transient control voltage induced in a loop circuit during the premagnetizing half cycles of the first stage comprising a resistor shunted by a rectifier connected from the junction of the coupling impedance and the first stage to one of said pair of power terminals, and said last named rectifier and the rectifier in said first stage being connected in back-to-back relation.

12. An amplifier system comprising in combination, alternating current supply means, a first magnetic amplifier including a serially connected saturable reactor winding, a rectifier, and an impedance element, means connecting said first magnetic amplifier in series with said supply means, a rectifier connected in parallel with said impedance element, said rectifier connected in back-to-back relation with the rectifier of said first magnetic amplifier, a second self-saturating magnetic amplifier including a serially connected saturable reactor winding and a rectifier connected with said supply means, means including a coupling resistor connecting the saturable reactor winding of said second magnetic amplifier in parallel with the series combination of the rectifier and saturable reactor winding of said first magnetic amplifier, signal input means for said amplifier system comprising a control winding coupled to control current flow in the reactor winding of said first magnetic amplifier, a neutralizing winding coupled to the saturable reactor winding of said second magnetic amplifier, means connecting said windings in series opposition whereby alternating voltages of the frequency of said alternating current supply means induced therein by said currents flowing in said first and second magnetic amplifiers are neutralized, the saturable reactor winding of said second amplifier being substantially insensitive to control currents flowing in said neutralizing windings, and utilization means connected in circuit with said second magnetic amplifier.

13. In a control system for a motor of the type having an armature and a pair of field windings for controlling the direction of rotation of said armature depending on the relative amount of current flowing in the respective windings, the combination comprising, alternating current supply means, a first magnetic amplifier stage comprising a pair of magnetic amplifiers each including a load winding, means including a common resistor element connecting the motor field windings with said supply means each in series with one of said amplifiers and the load winding thereof, control means for said system having a signal input circuit for said first magnetic amplifier stage comprising a control winding coupled with each load winding for controlling the current flow therein, a second magnetic amplifier stage connected in cascade with said first magnetic amplifier stage and including a load winding and a rectifier connected in series with said supply means, signal input means for said second magnetic amplifier stage for controlling the current flow in the load winding thereof in accordance with the current flow in the load windings of said first magnetic amplifier stage comprising a signal coupling circuit connection from said first magnetic amplifier stage at the junction of the field windings and the common resistor element to the connection between the rectifier and load winding of said second magnetic amplifier stage, and means connecting the motor armature in circuit with the rectifier and load winding of said second magnetic amplifier stage.

References Cited in the file of this patent

UNITED STATES PATENTS

| | | |
|---|---|---|
| 2,509,738 | Lord | May 30, 1950 |
| 2,554,203 | Morgan | May 22, 1951 |
| 2,636,150 | McKenney et al. | Apr. 21, 1953 |
| 2,688,724 | Newell | Sept. 7, 1954 |
| 2,731,521 | Crawford | Jan. 17, 1956 |
| 2,733,306 | Bedford | Jan. 31, 1956 |
| 2,733,307 | Ogle | Jan. 31, 1956 |